United States Patent
Omori

(10) Patent No.: US 10,621,703 B2
(45) Date of Patent: Apr. 14, 2020

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Hirotaka Omori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/459,119

(22) Filed: Jul. 1, 2019

(65) Prior Publication Data

US 2019/0325565 A1 Oct. 24, 2019

Related U.S. Application Data

(62) Division of application No. 15/970,763, filed on May 3, 2018.

(30) Foreign Application Priority Data

May 9, 2017 (JP) .................. 2017-093248

(51) Int. Cl.
| | | |
|---|---|---|
| *G06T 5/00* | (2006.01) | |
| *H04N 5/357* | (2011.01) | |
| *H04N 5/217* | (2011.01) | |
| *H04N 5/232* | (2006.01) | |
| *G06T 5/50* | (2006.01) | |

(52) U.S. Cl.
CPC .............. *G06T 5/002* (2013.01); *G06T 5/50* (2013.01); *H04N 5/217* (2013.01); *H04N 5/23229* (2013.01); *H04N 5/357* (2013.01); *G06T 2207/10016* (2013.01); *G06T 2207/10024* (2013.01)

(58) Field of Classification Search
CPC . G06T 5/002; G06T 5/50; G06T 2207/10016; G06T 2207/10024; H04N 5/217; H04N 5/23229; H04N 5/357
See application file for complete search history.

(56) References Cited

U.S. PATENT DOCUMENTS

| 4,242,704 A | * | 12/1980 | Ito ............................ H04N 5/21 348/620 |
| 2014/0354885 A1 | * | 12/2014 | Hepper ................ H04N 9/3179 348/607 |

* cited by examiner

Primary Examiner — Michael E Teitelbaum
(74) Attorney, Agent, or Firm — Canon U.S.A., Inc. IP Division

(57) ABSTRACT

An image processing apparatus includes a noise level calculation circuit, an inter-frame change amount calculation circuit, a recursive coefficient calculation circuit, and a composite processing circuit. The noise level calculation circuit detects a noise level of a signal of a focused frame in moving images. The inter-frame change amount calculation circuit detects the amount of change between the focused frame and the previous frame by using the noise level of the focused frame, the signal of the focused frame, and a signal of the previous frame after a noise reduction process. The recursive coefficient calculation circuit sets a coefficient for use in the noise reduction process according to the amount of change. The composite processing circuit performs the noise reduction process on the signal of the focused frame by using the signal of the focused frame, the signal of the previous frame after the noise reduction process, and the coefficient.

13 Claims, 11 Drawing Sheets

IMAGE PROCESSING APPARATUS, IMAGE PROCESSING METHOD, AND PROGRAM

CROSS-REFERENCE TO RELATED APPLICATIONS

This application is a divisional of U.S. patent application Ser. No. 15/970763 filed May 3, 2018, which claims the benefit of Japanese Patent Application No. 2017-093248 filed May 9, 2017, all of which are hereby incorporated by reference herein in their entirety.

BACKGROUND

Field of the Disclosure

The present disclosure relates to an image processing apparatus, an image processing method, and a program for processing moving images.

Description of the Related Art

A recursive noise reduction processing technique is known as a conventional technique for executing a noise reduction process on moving image signals. According to the recursive noise reduction processing technique, two frames consecutive in a temporal direction of moving image (i.e. an input signal of the current frame and an output signal of the previous frame) are blended to reduce random noise generated in the temporal direction. As a method for setting the blend ratio between signals of two frames consecutive in the temporal direction (hereinafter, the ratio is referred to as recursive coefficient), there is a known method, for example, as described in Japanese Patent Laid-Open No. 2000-224444. According to the method described in Japanese Patent Laid-Open No. 2000-224444, the amount of change between two frames is calculated and the recursive coefficient is set depending on the amount of change. In this manner, setting the recursive coefficient depending on the amount of change between frames allows a noise reduction process adapted to whether the subject seen in moving image is a stationary subject or a moving subject.

In many cases, the moving image subjected to a recursive noise reduction processing is a moving image with an insufficient signal-to-noise ratio (SN) ratio, such as a moving image captured under dark environments such as at a dark place or during the hours of darkness. When the moving image has an insufficient SN ratio, accuracy of the calculated amount of change between the frames becomes low under influence of noise in the images. In addition, in the recursive noise reduction processing described in Japanese Patent Laid-Open No. 2000-224444, when the accuracy of the calculated amount of change between frames is low, no appropriate value of recursive coefficient can be obtained. In this case, afterimages (image trailing) may occur around a moving subject or noise (in particular, color noise) may remain in a stationary subject.

SUMMARY

The present disclosure allows image processing with suppression of residual noise and afterimages in a moving image.

An aspect of the present disclosure is to provide an image processing apparatus including a detection circuit that detects a noise level of a signal of a focused frame in moving images, a change amount detection circuit that detects the amount of change between the focused frame and a previous frame preceding the focused frame on a time axis by using the noise level of the focused frame, the signal of the focused frame, and a signal of the previous frame after a noise reduction process, a coefficient calculation circuit that sets a coefficient for use in the noise reduction process in accordance with the amount of change, and a processing circuit that performs a noise reduction process on the signal of the focused frame by using the signal of the focused frame, the signal of the previous frame after the noise reduction process, and the coefficient.

Further features of the present disclosure will become apparent from the following description of exemplary embodiments (with reference to the attached drawings).

DESCRIPTION OF THE EMBODIMENTS

An embodiment of the present disclosure will be described below with reference to the drawings.

Figure 1:
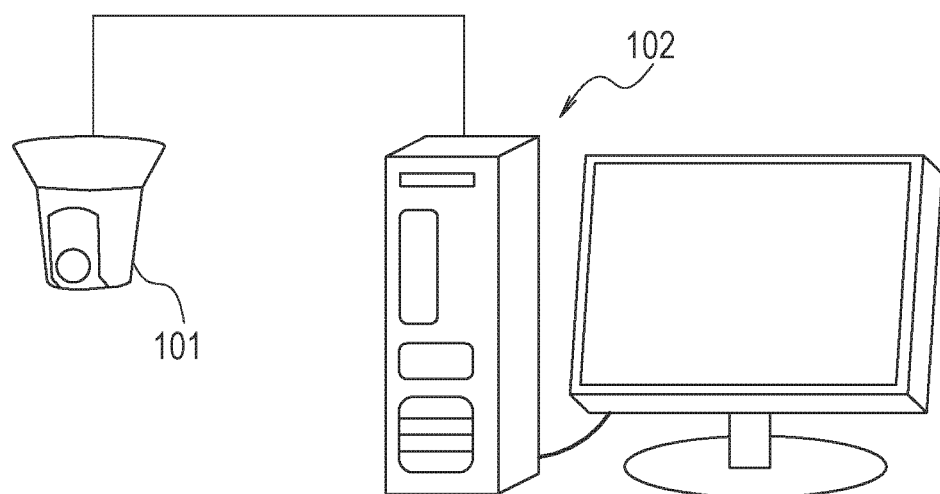
FIG. 1 is a diagram illustrating a schematic configuration example of an imaging system according to one or more aspects of the present disclosure.

FIG. 1 is a diagram illustrating a schematic configuration example of an imaging system to which an image processing apparatus according to the embodiment is applied. The imaging system illustrated in FIG. 1 includes a monitor camera 101 that can capture moving images and a client device 102 that is connected communicably to the monitor camera 101 via, for example, an Internet Protocol (IP) network or the like. An example of the monitor camera 101 including the functions of the image processing apparatus according to the embodiment will be described here. Alternatively, the client device 102 may include the functions of the image processing apparatus according to the embodiment. The moving images captured by the monitor camera 101 are sent to the client device 102 so as to be displayed and, as necessary, be recorded. In the embodiment, the monitor camera 101 is taken as an example. However, the present disclosure is not limited to the camera, but may be any one of various mobile terminals such as a digital camera, a digital video camera, a smartphone and a tablet terminal including a camera function, an industrial camera, an in-vehicle camera, and a medical camera.

Figure 2:
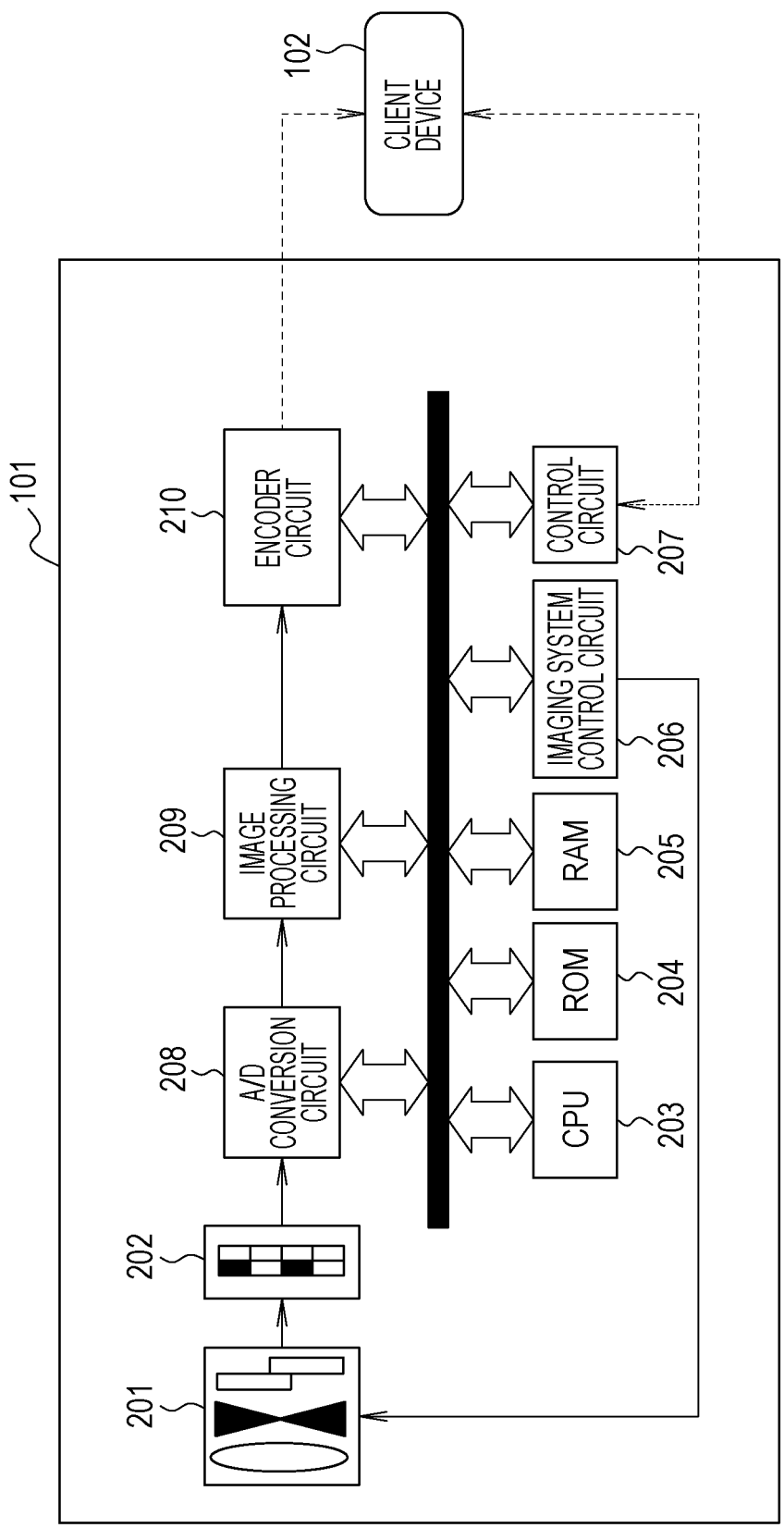
FIG. 2 is a block diagram illustrating an internal configuration example of an imaging apparatus according to one or more aspects of the present disclosure.

FIG. 2 is a block diagram illustrating a schematic internal configuration example of the monitor camera 101 according to the embodiment illustrated in FIG. 1.

An imaging optical system 201 includes a zoom lens, a focus lens, a camera shake correction lens, an aperture, a shutter, and the like, to form an optical image of a subject or the like on an imaging plane of an imaging element 202 (focusing). The imaging element 202 is a color imaging sensor that has a photoelectric conversion element converting light incident on the imaging plane into electric signals, and color filters corresponding to the individual pixels of the imaging element. The imaging element 202 receives the light incident on the imaging plane through the color filters, converts the same into electric signals, and outputs the same. The imaging element 202 is an imaging sensor that can set an arbitrary exposure time to all the pixels. In the case of the monitor camera 101 of the embodiment, the imaging element 202 captures moving images and the imaging element 202 outputs captured image signals of frames consecutive on the time axis of the moving images.

A CPU 203 executes processes related to all the components of the monitor camera 101 according to the embodiment. The CPU 203 reads sequentially instructions from programs stored in a read only memory (ROM) 204 and a random access memory (RAM) 205, and executes the processes in accordance with the results of parsing the instructions. An imaging system control circuit 206 performs controls such as focusing, shutter opening and closing, and aperture adjustment of the imaging optical system 201, in accordance with instructions such as focus control instruction, shutter control instruction, and aperture control instruction supplied from the CPU 203. A control circuit 207 performs controls of the components via the CPU 203 in accordance with instructions from the client device 102. The ROM 204 stores the programs to be executed by the CPU 203 and various setting values. The RAM 205 unfolds the programs from the ROM 204 and temporarily stores data under processing in the components.

An A/D conversion circuit 208 converts an analog electric signal (analog imaging signal) obtained through the photoelectric conversion by the imaging element 202 into digital signal values. The digital signal values obtained through the analog-digital conversion by the A/D conversion circuit 208 are sent as captured image data of frames in the moving images to an image processing circuit 209. The image processing circuit 209 performs image processing on the captured image data, which will be described later in detail. An encoder circuit 210 uses the image data after the image processing by the image processing circuit 209 to perform a process for conversion into a predetermined file format, such as JPEG or H.264, that is, an encoding process. The encoder circuit 210 sends the image data after the encoding process to the client device 102.

Figure 3:
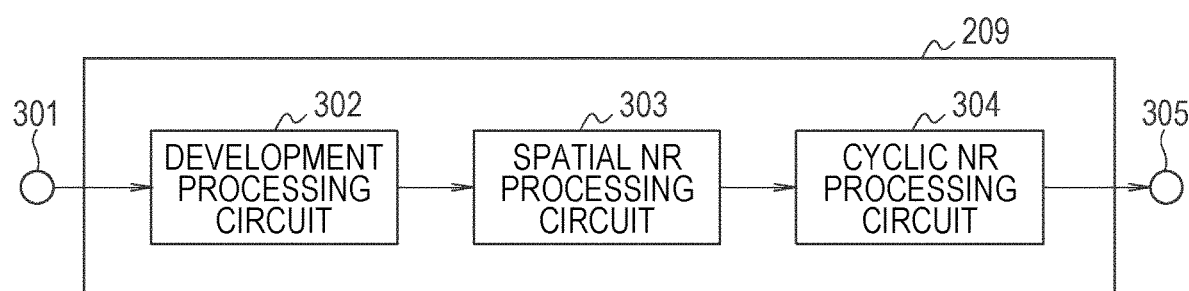
FIG. 3 is a block diagram illustrating an internal configuration example of an image processing unit according to one or more aspects of the present disclosure.

FIG. 3 is a block diagram illustrating a schematic internal configuration example of the image processing circuit 209 included in the monitor camera 101 according to the embodiment.

An image input terminal 301 accepts the input of the captured image data of the frames in moving images that have been captured by the imaging element 202 and subjected to the analog-digital conversion by the A/D conversion circuit 208 as described above. A development processing circuit 302 performs processes related to de-mosaic, white balance, gamma, sharpness on the captured image data input into the image input terminal 301. A spatial noise reduction (NR) processing circuit 303 performs a spatial filtering process on the image having been processed by the development processing circuit 302 to reduce random noise generated in a spatial direction. A recursive NR processing circuit 304 performs a temporal filtering process on the images after the spatial NR process to implement a recursive noise reduction processing to reduce random noise generated in a temporal direction. The detailed configuration and operations of the recursive NR processing circuit 304 for reducing random noise in the temporal direction will be described later. An image output terminal 305 outputs the image after the foregoing processes to the encoder circuit 210 illustrated in FIG. 1.

The configuration and operations of the recursive NR processing circuit 304 will be described below.

First, the principles and issues of the recursive NR process will be described. In the recursive NR process, signals of two frames consecutive in the temporal direction (an input signal of the current frame and an output signal of the previous frame) are blended to reduce random noise generated in the temporal direction. In the embodiment, the blend ratio between the signals of the two frames is called recursive coefficient.

In the following description, as two frames consecutive in the temporal direction of moving images, a frame at time t (t≥2) and a frame at time t-1 will be taken as an example. In the frame at time t, for example, an input signal in the recursive NR process will be expressed as IN(v, h, t), and an output signal after the recursive NR process will be expressed as OUT(v, h, t). In the term (v, h, t), v, h represents a two-dimensional coordinate position (v, h) in the image of the frame at time t in a horizontal direction (x-axis direction) and a vertical direction (y-axis direction). That is, IN(v, h, t) represents an input signal corresponding to the pixel at the two-dimensional coordinate position (v, h) of the frame at time t, and OUT(v, h, t) represents an output signal after the recursive NR process corresponding to the pixel at the two-dimensional position (v, h) of the frame at time t. The input signal and the output signal of the frame at time t-1 can be expressed like those of the frame at time t, and for example, the output signal can be expressed as OUT(v, h, t-1). When the recursive coefficient in the recursive NR process is expressed as $\alpha$ ($0 \leq \alpha \leq 1$), the output signal OUT(v, h, t) after the recursive NR process is calculated by a weighted add operation with $\alpha$ as a weight, as expressed in Equation (1) as follows:

$$\text{OUT}(v, h, t) = (1-\alpha) \times \text{IN}(v, h, t) + \alpha \times \text{OUT}(v, h, t-1) \quad \text{Equation (1)}$$

When the subject seen in the moving images is a stationary subject that stands still or hardly moves, the amount of change in image between the two frames at time t and time t-1 is small. In this case, setting the recursive coefficient α to a large value, that is, increasing the weight makes it possible to perform a strong noise reduction process on the images. That is, when the amount of change between the two frames is small, setting the recursive coefficient α to a large value makes it possible to reduce favorably random noise generated in the temporal direction of the images. Meanwhile, when the subject is a moving subject, the amount of change in image between the two frames at time t and time t-1 is large. In this case, setting the recursive coefficient α (weight) to a small value makes it possible to perform a weak noise reduction process on the images to leave many signal components in the image region of the moving subject. In this manner, setting the recursive coefficient α in accordance with the amount of change between the frames in the recursive NR process makes it possible to perform an appropriate noise reduction process on individual images, regardless of whether the subject seen in the frames in the moving images is a stationary subject or a moving subject.

As a method for enabling determination on whether the subject seen in moving images is a stationary subject or a moving subject, Japanese Patent Laid-Open No. 63-131794 describes a method of motion detection. According to the method described in Japanese Patent Laid-Open No. 63-131794, a signal having undergone motion detection based on a luminance signal and a signal having undergone motion detection based on a color signal are composited to enable high-accuracy motion detection even in images having changes in color with small differences in luminance. According to this method, it is possible to determine whether the subject seen in moving images is a stationary subject or a moving subject even though the moving images have changes in color with small differences in luminance. Therefore, it is quite conceivable to set the recursive coefficient in accordance with the motion detected by this method.

When the recursive NR process is performed on images with a small SN ratio and a large amount of noise, such as images captured under dark environments such as at a dark place or during the hours of darkness, there may occur an afterimage (image trailing) around a moving subject or residual noise (in particular, color noise) in a stationary subject. That is, in the case of images with a small SN ratio and a large amount of noise, the accuracy in detecting the amount of change between frames becomes low, and the accuracy of the recursive coefficient set based on the amount of change becomes low as well. When the recursive NR process is performed by the use of such a low-accuracy recursive coefficient, there may occur an afterimage around a moving subject or residual noise in a stationary subject. According to the method of motion detection described in Japanese Patent Laid-Open No. 63-131794 as well, the accuracy of motion detection becomes low in moving images with an insufficient SN ratio and a large amount of noise. Therefore, in the case of setting the recursive coefficient in accordance with the motion detected by this method, it is difficult to obtain an appropriate recursive coefficient.

In the embodiment, as described later, the amounts of change between frames are detected with consideration given to noise levels of luminance components and color components obtained from input signals, and set the recursive coefficients for the recursive NR process based on the amounts of change. Accordingly, the embodiment makes it possible to reduce residual noise (color noise) in a stationary subject and suppress an afterimage (image trailing) around a moving subject.

A configuration and operations of the recursive NR processing circuit 304 according to the embodiment will be described below in detail.

Figure 4:
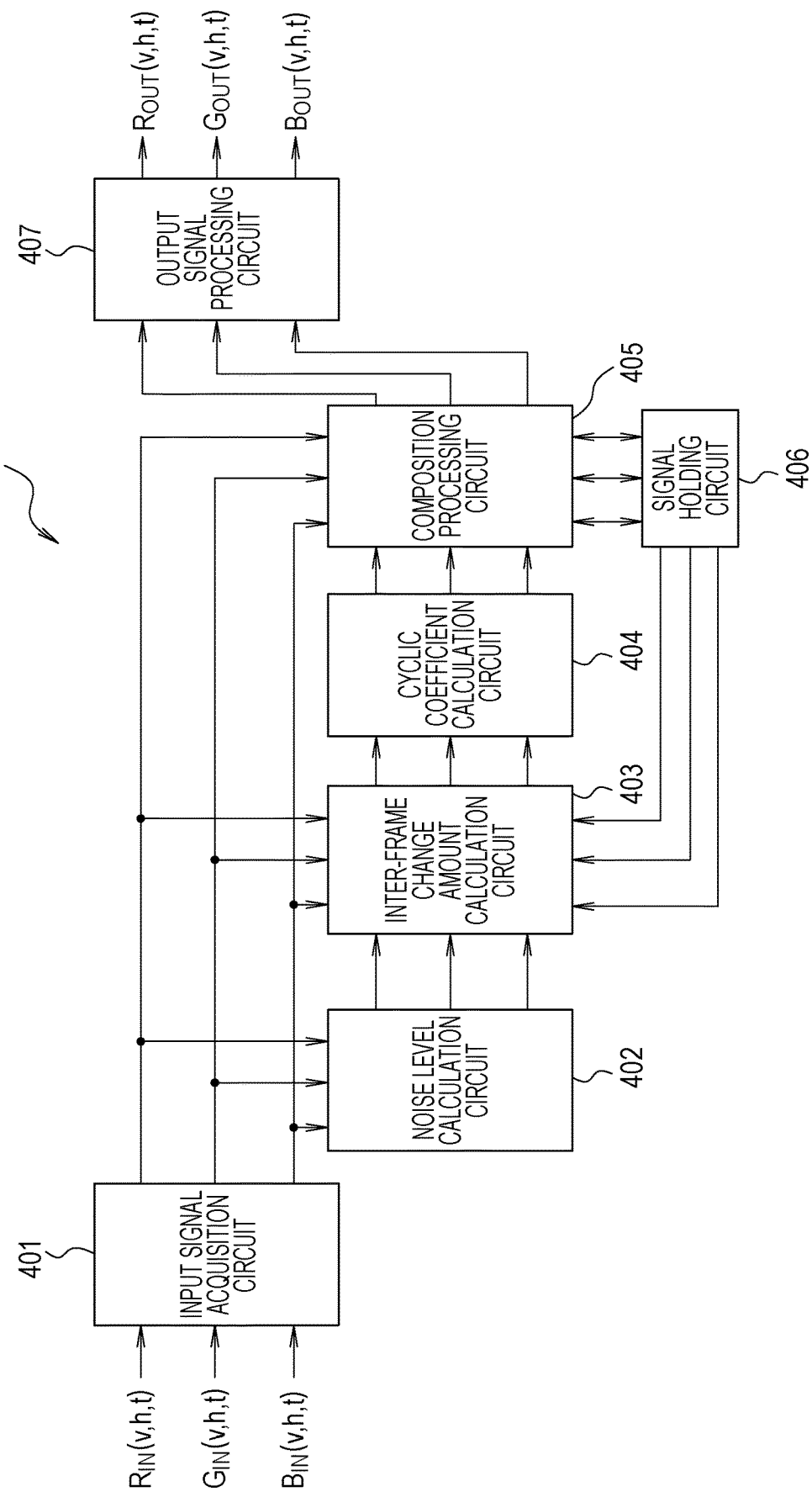
FIG. 4 is a block diagram illustrating an internal configuration example of a recursive NR processing unit according to one or more aspects of the present disclosure.

FIG. 4 is a block diagram illustrating a configuration example of the recursive NR processing circuit 304 according to the embodiment that performs a recursive NR process on input signals of moving images. The recursive NR processing circuit 304 of the embodiment includes an input signal acquisition circuit 401, a noise level calculation circuit 402, an inter-frame change amount calculation circuit 403, a recursive coefficient calculation circuit 404, a composite processing circuit 405, a signal holding circuit 406, and an output signal processing circuit 407.

The input signal acquisition circuit 401 sets a frame at certain time t as a focused frame, among frames consecutive on the time axis and constituting moving images, and acquires input signals of three primary colors of red (R), green (G), and blue (B) (hereinafter, referred to as RGB input signal) of the focused frame. In the following description, the time t will be set as the current time, and the focused frame at the current time will be referred to as current frame. The input signal acquisition circuit 401 converts the RGB input signals of the current frame into signals of luminance (Y), chrominance (U), and chrominance (V) (hereinafter, referred to as YUV input signals). The process for converting the RGB input signals of the current frame into the YUV input signals will be described later in detail. The YUV input signals generated in the conversion process performed by the input signal acquisition circuit 401 are sent to the noise level calculation circuit 402, the inter-frame change amount calculation circuit 403, and the composite processing circuit 405.

The noise level calculation circuit 402 performs a noise level detection process to calculate noise levels of YUV components from the YUV input signals of the current frame. Hereinafter, the component of luminance Y will be referred to as Y component, the component of chrominance U as U component, and the component of chrominance V as V component. In addition, the U and V components will be collectively referred to as UV components. The process for calculating the noise levels of the YUV components will be described later in detail. The noise level calculation circuit 402 outputs signals indicative of the calculated noise levels of the YUV components of the current frame to the inter-frame change amount calculation circuit 403.

The inter-frame change amount calculation circuit 403 accepts the input of the YUV input signals of the current frame and YUV output signals of the frame preceding, by one, the current frame on the time axis (hereinafter, referred to as previous frame) that have undergone the composition process by the composite processing circuit 405 described later and have been held by the signal holding circuit 406. The inter-frame change amount calculation circuit 403 performs an inter-frame change amount detection process to calculate the differences in the YUV components between the current frame and the previous frame based on the noise levels of the YUV input signals of the current frame, the YUV input signals of the current frame, and the YUV output signals of the previous frame. The process for calculating the amount of change between the frames will be described later in detail. The inter-frame change amount calculation circuit 403 outputs the signals indicating the amounts of change between the frames of the YUV components to the recursive coefficient calculation circuit 404.

The recursive coefficient calculation circuit 404 calculates the recursive coefficients of the YUV components in accordance with the amounts of change between the frames supplied from the inter-frame change amount calculation circuit 403. The process for calculating the recursive coefficients in accordance with the amounts of change between the frames will be described later in detail. The recursive coefficient calculation circuit 404 outputs the signals indicating the calculated recursive coefficients of the YUV components to the composite processing circuit 405.

The composite processing circuit 405 accepts the input of the YUV input signals of the current frame and the YUV output signals that have undergone the composition process by the composite processing circuit 405 of the previous frame and been held by the signal holding circuit 406. The composite processing circuit 405 blends the YUV input signals of the current frame and the YUV output signals of the previous frame based on the values of the recursive coefficients to generate the YUV output signals of the current frame. The YUV output signals after the composition process by the composite processing circuit 405 constitute the output signals after the recursive noise reduction processing. The composition process by the composite processing circuit 405 will be described later in detail. The YUV output signals of the current frame generated in the composition process by the composite processing circuit 405 are sent to the output signal processing circuit 407 and the signal holding circuit 406.

The signal holding circuit 406 holds the YUV output signals of the current frame after the composition process by the composite processing circuit 405. The YUV output signals held by the signal holding circuit 406 are used as YUV output signals of the previous frame described above when the inter-frame change amount calculation circuit 403 calculates the amounts of change between the frames and when the composite processing circuit 405 performs the composition process.

The output signal processing circuit 407 converts the YUV output signals of the current frame input from the composite processing circuit 405 into RGB signals (RGB output signals). The RGB output signals are sent as image data of the current frame after the noise reduction process by the recursive NR processing circuit 304 to the image output terminal 305 illustrated in FIG. 3.

Figure 5:
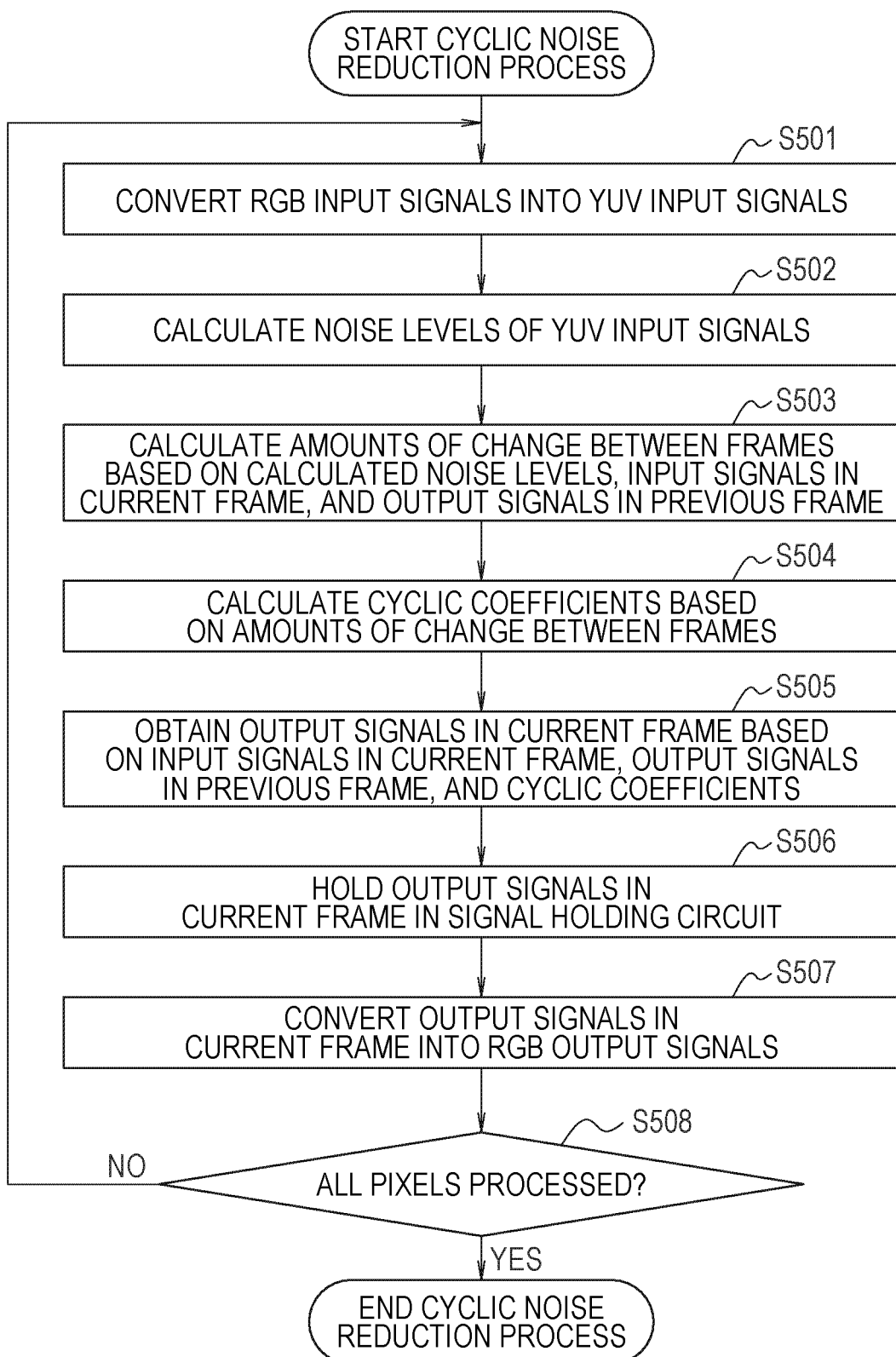
FIG. 5 is a flowchart of a recursive NR process according to one or more aspects of the present disclosure.

FIG. 5 is a flowchart of a process performed by the recursive NR processing circuit 304 illustrated in FIG. 4. In the flowchart of FIG. 5, steps S501 to S508 are abbreviated as S501 to S508. The configuration illustrated in FIG. 4 and the process in the flowchart described in FIG. 5 may be implemented by hardware configuration, or some of them may be implemented by software configuration and the other may be implemented by hardware configuration. In the case of implementing the configuration and the process by software configuration, the process in the flowchart of FIG. 5 is implemented by the CPU executing the programs stored in, for example, the ROM and the like.

In S501 of FIG. 5, the input signal acquisition circuit 401 acquires RGB input signals $R_{IN}(v, h, t)$, $G_{IN}(v, h, t)$, and $B_{IN}(v, h, t)$ of the current frame at time t described above. The input signal acquisition circuit 401 then converts the RGB input signals $R_{IN}(v, h, t)$, $G_{IN}(v, h, t)$, and $B_{IN}(v, h, t)$ into YUV input signals $Y_{IN}(v, h, t)$, $U_{IN}(v, h, t)$, and $V_{IN}(v, h, t)$ by Equation (2) as conversion equation.

$Y_{IN}(v, h, t)=0.299 \times R_{IN}(v, h, t)+0.587 \times G_{IN}(v, h, t)+0.114 \times B_{IN}(v, h, t) U_{IN}(v, h, t)=-0.169 \times R_{IN}(v, h, t)-0.331 \times G_{IN}(v, h, t)+0.500 \times B_{IN}(v, h, t) V_{IN}(v, h, t)=0.500 \times R_{IN}(v, h, t)-0.419 \times G_{IN}(v, h, t)-0.081 \times B_{IN}(v, h, t)$ Equation (2)

Next, in S502, the noise level calculation circuit 402 calculates the noise levels of the YUV components from the YUV input signals $Y_{IN}(v, h, t)$, $U_{IN}(v, h, t)$, and $V_{IN}(v, h, t)$ of the current frame. For example, the noise level calculation circuit 402 calculates the dispersions of noise in the image of the current frame as evaluation values indicating the noise levels of the image of the current frame, by using Equations (3) and (4). Equations (3) and (4) are equations for determining noise dispersion $\sigma^2_{Y(v, h, t)}$ for the component of luminance Y. Although not described as an equation, the noise level calculation circuit 402 calculates noise dispersions $\sigma^2_{U(v, h, t)}$ and $\sigma^2_{V(v, h, t)}$ for the component of chrominance U and the component of V by Equations (3) and (4) where Y is replaced with U or V.

$$\sigma^2_{Y(v,h,t)} = \frac{1}{(2 \times s1 + 1)(2 \times s2 + 1)} \sum_{i=-s1}^{s1} \sum_{j=-s2}^{s2} (Y(v+i, h+j, t) - \overline{Y}(v, h, t))^2$$ Equation (3)

$$\overline{Y}(v, h, t) = \frac{1}{(2 \times s1 + 1)(2 \times s2 + 1)} \sum_{i=-s1}^{s1} \sum_{j=-s2}^{s2} Y(v+i, h+j, t)$$ Equation (4)

Figure 6:
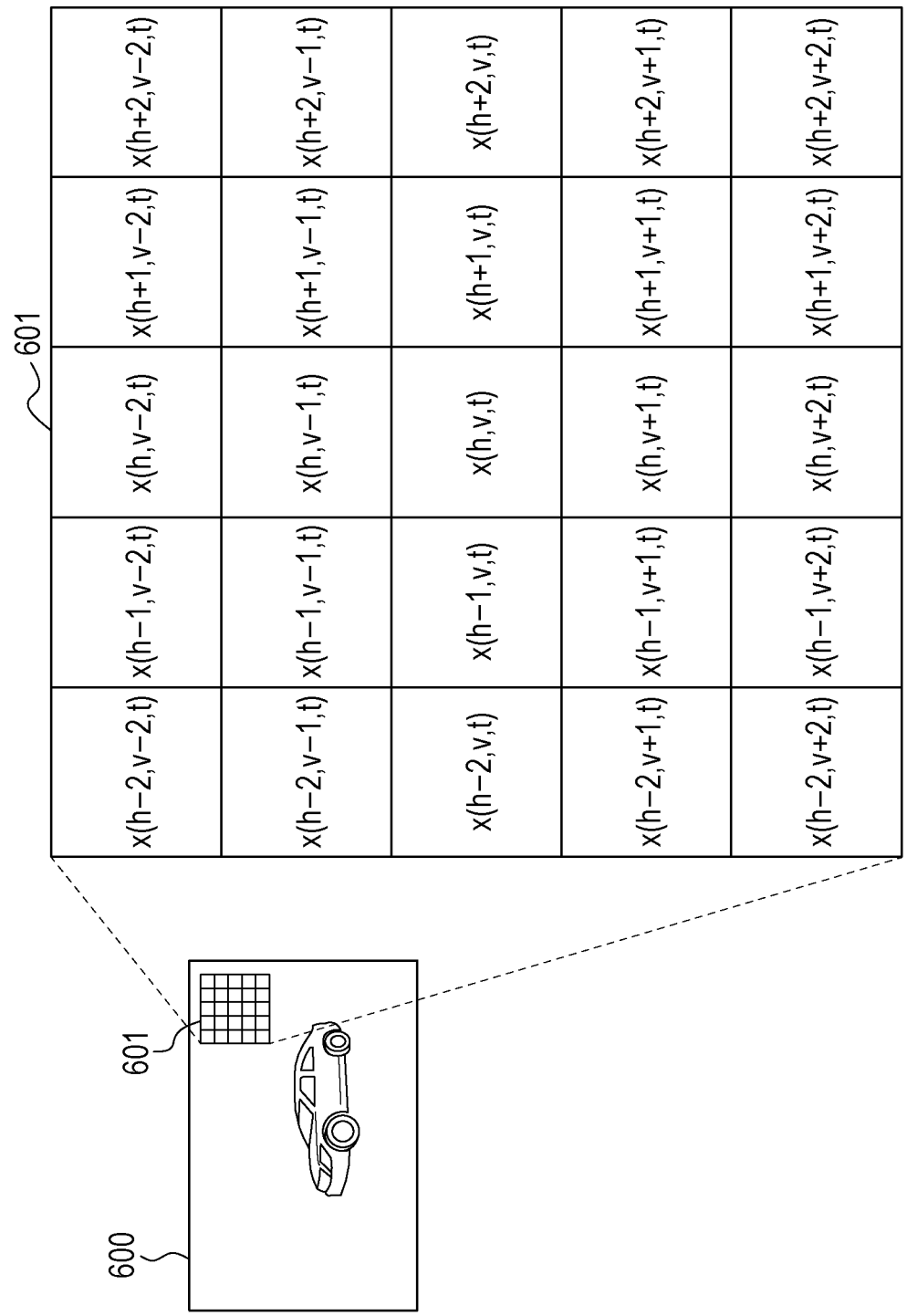
FIG. 6 is an illustrative diagram of an example of calculating noise dispersion according to one or more aspects of the present disclosure.

By setting large values of s1 and s2 in Equation (3) and (4) makes it possible to calculate accurately the dispersions of noise included in the signals. FIG. 6 illustrates an example of calculating noise dispersions in a region 601 of 5×5 pixels centered on a focused pixel x(h, v, t) in an image 600 at time t in the case where s1 is 2 and s2 is 2. As illustrated in FIG. 6, when s1 is 2 and s2 is 2, the equations for calculating the noise dispersions in the focused pixel x(h, v, t) are expressed as in Equations (5) and (6) as follows:

$$\sigma^2_{x[h,v,t]} = \frac{1}{25} \sum_{i=-2}^{2} \sum_{j=-2}^{2} (x[h+i, v+j, t] - \overline{x}([h, v, t])^2$$ Equation (5)

$$\overline{x}[h, v, t] = \frac{1}{25} \sum_{i=-2}^{2} \sum_{j=-2}^{2} x[h+i, v+j, t]$$ Equation (6)

The evaluation values of the noise levels are not limited to the dispersions calculated by Equations (3) and (4), but may be any one of various evaluation values such as standard deviations of noise or noise characteristics of the imaging sensor. In addition, the evaluation values of the noise levels may be a combination of at least two of dispersions, standard deviations, noise characteristics of the imaging sensor, and the like.

Next, in S503, the inter-frame change amount calculation circuit 403 selects any one of a plurality of modes in accordance with the noise levels of the YUV input signals calculated in S502, and calculates the amounts of change between the frames of the YUV components in the selected mode. In the embodiment, a first mode M1, a second mode M2, and a third mode M3 are used as modes for calculating the amounts of change between frames. The first mode M1 is a mode in which the amounts of change for the Y component, the U component, and the V component are independently detected, the detail of which will be described later. The second mode M2 is a mode in which the amounts of change calculated for the Y component, the U component, and the V component are blended and the blended value is set as amount of change. The third mode M3 is a mode in which preset values are used as amounts of change without detecting the amounts of change between frames.

Figure 7:
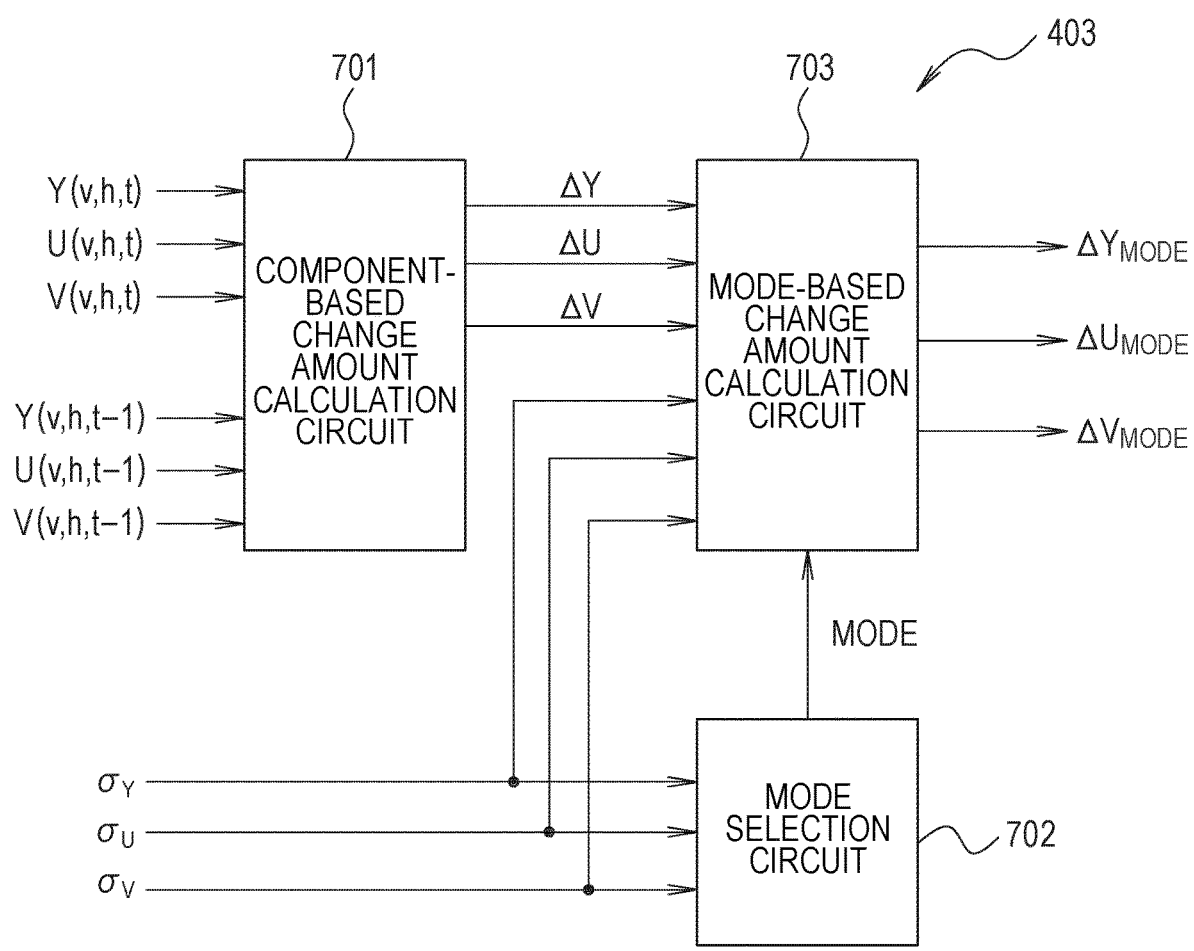
FIG. 7 is a block diagram illustrating an internal configuration example of an inter-frame change amount calculation unit according to one or more aspects of the present disclosure.

FIG. 7 is a block diagram illustrating a configuration example of the inter-frame change amount calculation circuit 403. As illustrated in FIG. 7, the inter-frame change amount calculation circuit 403 includes a component-based change amount calculation circuit 701, a mode selection circuit 702, and a mode-based change amount calculation circuit 703.

The component-based change amount calculation circuit 701 performs a component-based detection process to detect the amounts of change between the YUV input signals of the current frame and the YUV output signals of the previous frame for the individual signal components of YUV, and to outputs the amounts of change detected for the individual YUV components as the component-based amounts of change. The process for calculating the component-based amounts of change by the component-based change amount calculation circuit 701 will be described later in detail.

The mode selection circuit 702 selects one of the first mode M1, the second mode M2, and the third mode M3 based on the noise dispersions of the YUV components calculated by the noise level calculation circuit 402. The process for mode selection by the mode selection circuit 702 will be described later in detail. The mode selection circuit 702 sends a mode signal indicative of the selected mode to the mode-based change amount calculation circuit 703.

The mode-based change amount calculation circuit 703 accepts the input of the component-based amounts of change calculated by the component-based change amount calculation circuit 701, the noise dispersions of the YUV components calculated by the noise level calculation circuit 402 as described above, and the mode signal indicative of the mode selected by the mode selection circuit 702. The mode-based change amount calculation circuit 703 calculates mode-based amounts of change based on the component-based amounts of change for the YUV components, the noise dispersions of the YUV components, and the mode signal. The process for calculating the mode-based amounts of change by the mode-based change amount calculation circuit 703 will be described later in detail. The mode-based change amount calculation circuit 703 sends signals indicative of the calculated mode-based amounts of change to the recursive coefficient calculation circuit 404 illustrated in FIG. 4.

Figure 8:
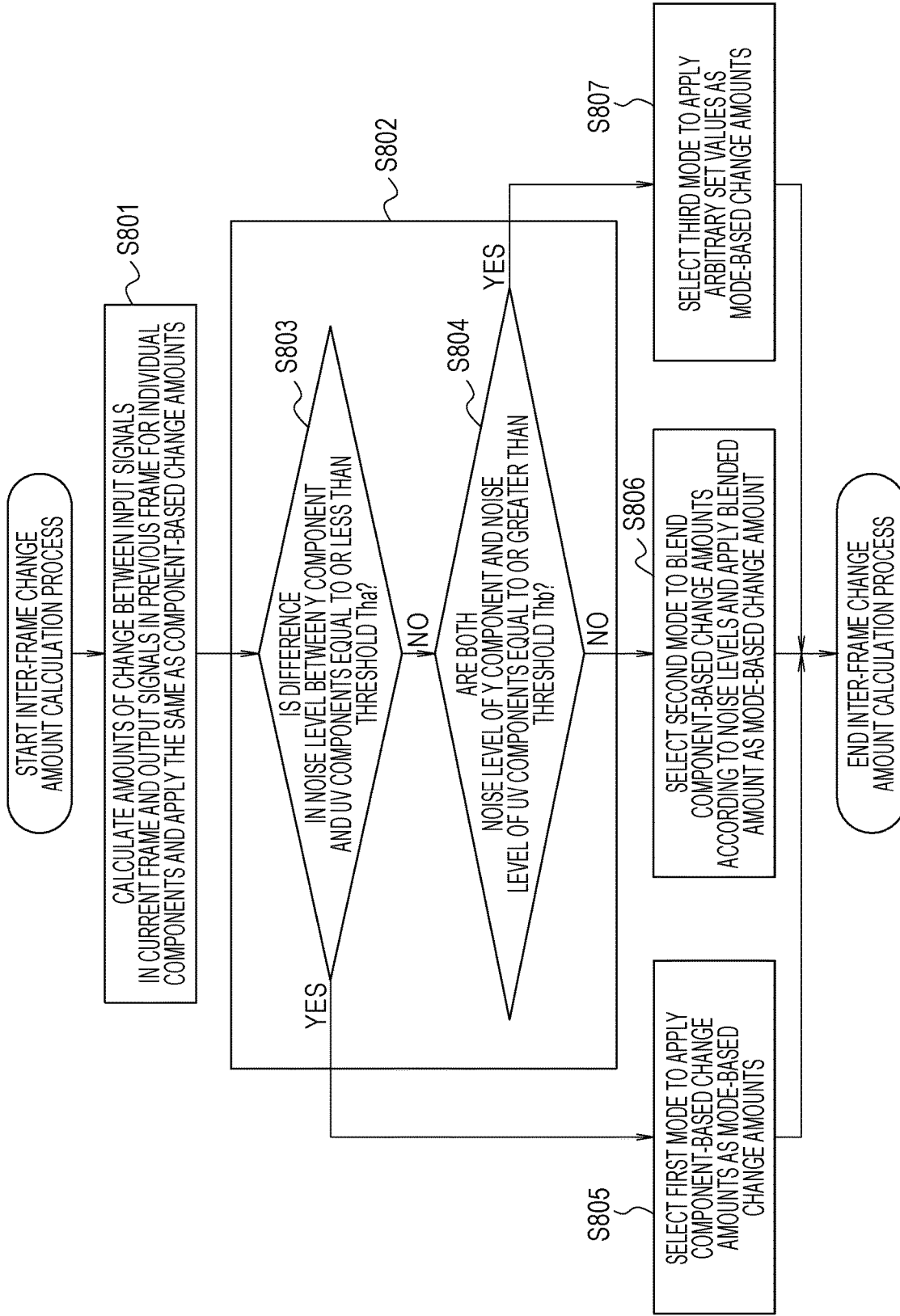
FIG. 8 is a flowchart of an inter-frame change amount calculation process according to one or more aspects of the present disclosure.

FIG. 8 is a flowchart of a process performed by the inter-frame change amount calculation circuit 403 illustrated in FIG. 7, which is a subdivision of S503 described in FIG. 5.

In S801 of FIG. 8, the component-based change amount calculation circuit 701 calculates the amounts of change between the YUV input signals of the current frame and the YUV output signals of the previous frame for the individual YUV components, and sets the same as the component-based amounts of change. In this case, the component-based change amount calculation circuit 701 determines difference absolute values for the individual YUV components as expressed in Equations (7) to (9), and calculates the same as the component-based amounts of change $\Delta Y(v, h, t)$, $\Delta U(v, h, t)$, and $\Delta V(v, h, t)$. The component-based amounts of change are not limited to the difference absolute values but may be calculated as, for example, difference square values, difference absolute values of low-frequency components, or the like.

$$\Delta Y(v, h, t) = |Y(v, h, t) - Y(v, h, t-1)| \quad \text{Equation (7)}$$

$$\Delta U(v, h, t) = |U(v, h, t) - U(v, h, t-1)| \quad \text{Equation (8)}$$

$$\Delta V(v, h, t) = |V(v, h, t) - V(v, h, t-1)| \quad \text{Equation (9)}$$

Figure 9:
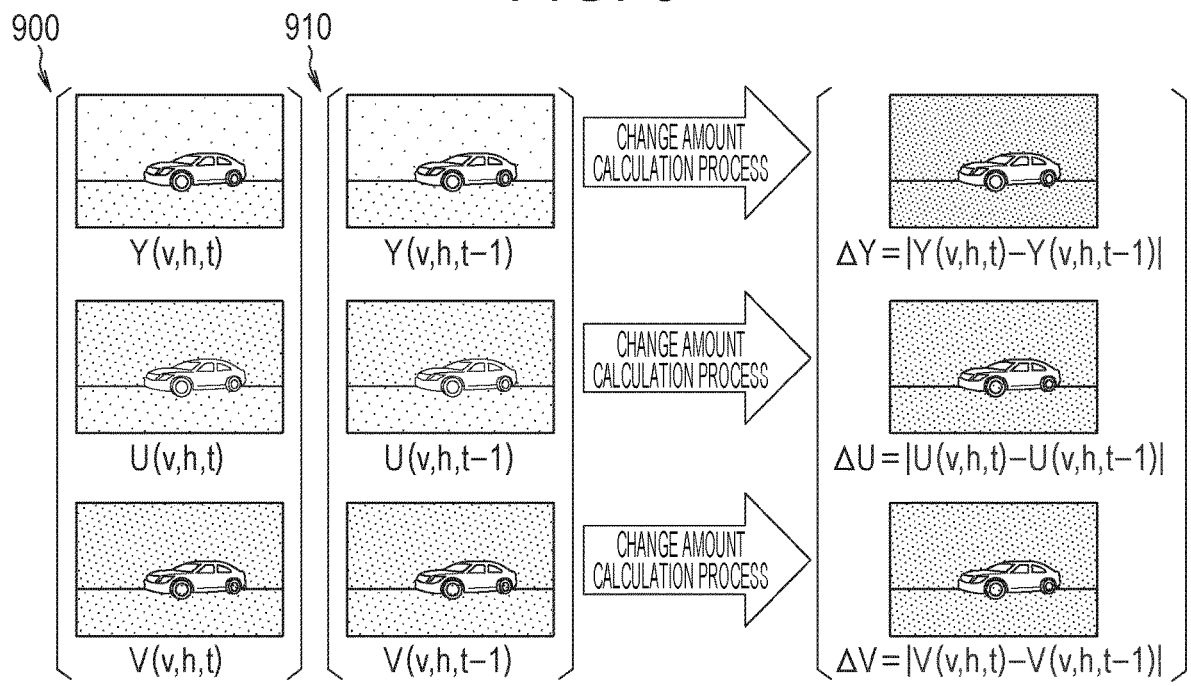
FIG. 9 is an illustrative diagram of the amounts of change between frames for individual components according to one or more aspects of the present disclosure.
Figure 11A:
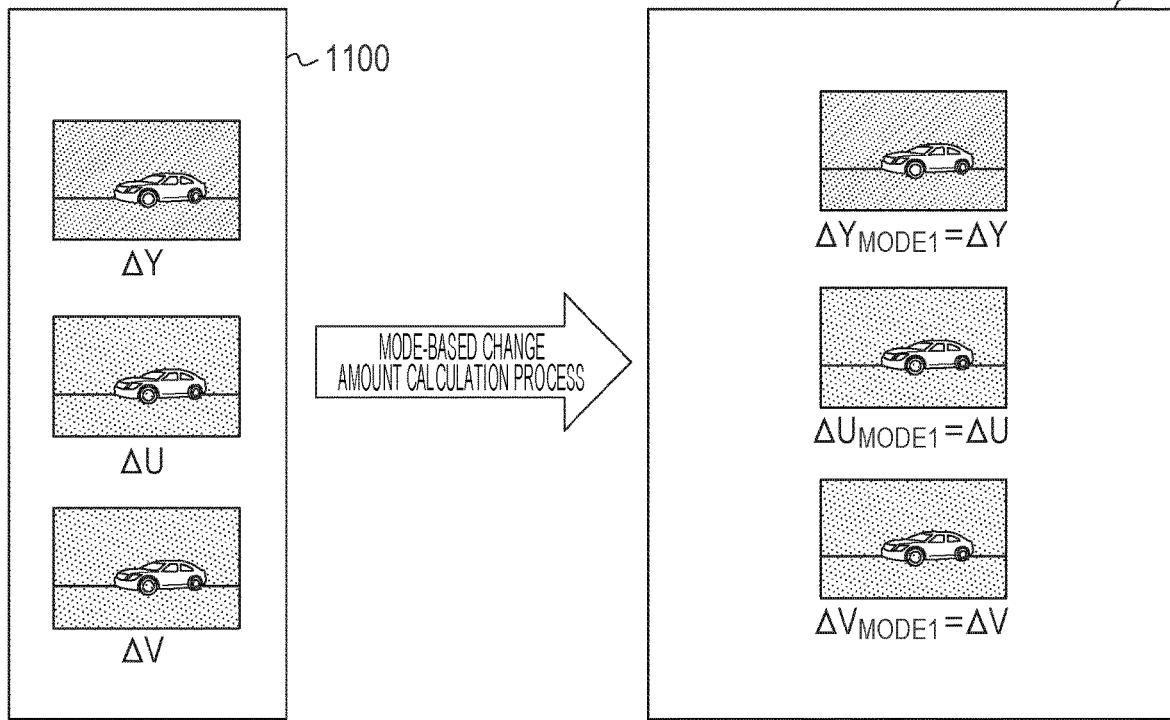
FIG. 11A is a diagram for describing a process for calculating the amounts of change between frames in a first mode M1.
Figure 11B:
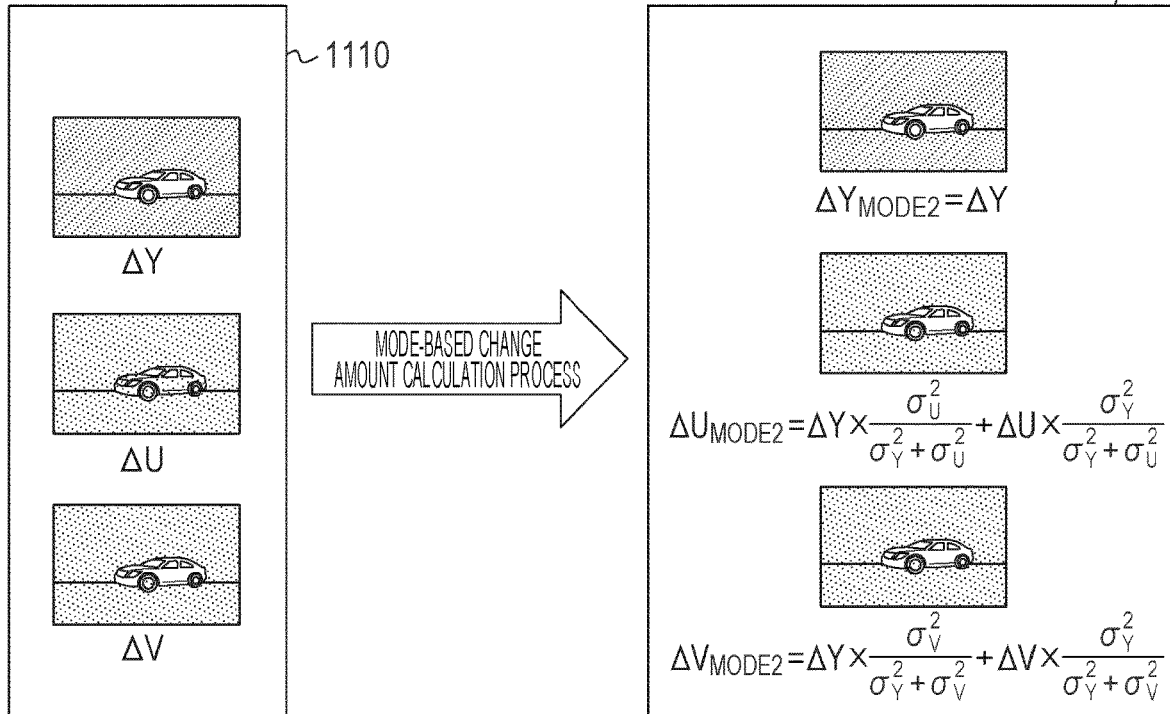
FIG. 11B is a diagram for describing a process for calculating the amounts of change between frames in a second mode M2 according to one or more aspects of the present disclosure.

FIG. 9 is an image diagram illustrating an example of the amounts of change for individual components based on a frame 900 at time t and a frame 910 at time t-1. As illustrated in FIG. 9, an inter-frame amount of change $\Delta Y(v, h, t)$ is calculated by Equation (7) from a Y component $Y(v, h, t)$ of the frame 900 and a Y component $Y(v, h, t-1)$ of the frame 910. In addition, inter-frame amounts of change $\Delta U(v, h, t)$ and $\Delta V(v, h, t)$ are calculated by Equations (8) and (9) from UV components $U(v, h, t)$ and $V(v, h, t)$ of the frame 900 and UV components $U(v, h, t-1)$ and $V(v, h, t-1)$ of the frame 910. FIG. 9, and FIGS. 11A and 11B described later represent $\Delta Y(v, h, t)$, $\Delta U(v, h, t)$, and $\Delta V(v, h, t)$ calculated by Equations (7), (8), and (9) as $\Delta Y$, $\Delta U$, and $\Delta V$.

Next, in S802, the mode selection circuit 702 determines what mode, among the first mode M1, the second mode M2, and the third mode M3, is to be used in accordance with the noise levels of the YUV components acquired by the noise level calculation circuit 402. S802 includes S803 and S804.

Figure 10:
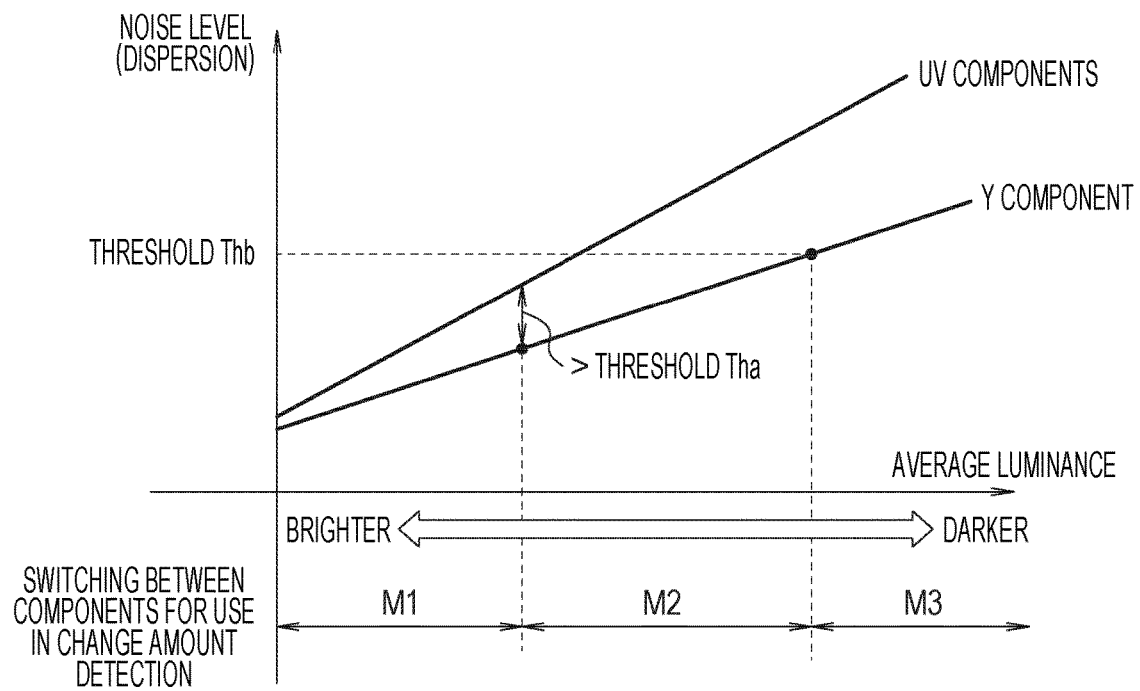
FIG. 10 is an illustrative diagram of an example of mode selection according to one or more aspects of the present disclosure.

FIG. 10 is an illustrative diagram describing an example of mode selection based on the assumption that the noise level of the UV components is higher than the noise level of the Y component of the frames in moving images captured under low-light intensity environments such as during the hours of darkness.

In S803, the mode selection circuit 702 compares the difference between the noise level of the Y component and the noise level of the UV components to a threshold indicating a predetermined range (threshold Tha described in FIG. 10). Specifically, in S803, the mode selection circuit 702 determines whether all the noise levels of the YUV components are low and the difference between the noise level of the Y component and the noise level of the UV components is equal to or less than the threshold (equal to or lower than the threshold Tha described in FIG. 10). When determining in S803 that the difference between the noise level of the Y component and the noise level of the UV components is equal to or lower than the threshold Tha (Yes), the mode selection circuit 702 moves the process to S805.

When moving to S805, the mode selection circuit 702 selects the first mode M1 and sends a mode signal indicative of the selected first mode M1 to the mode-based change amount calculation circuit 703. Then, in S805, the mode-based change amount calculation circuit 703 outputs directly the amounts of change $\Delta Y(v, h, t)$, $\Delta U(v, h, t)$, and $\Delta V(v, h, t)$ of the YUV components calculated in S801 as the mode-based amounts of change. After S805, the process in the flowchart of FIG. 8 is performed on the next focused frame.

FIG. 11A is an image diagram illustrating an example of an input 1100 and an output 1101 of the mode-based change amount calculation circuit 703 in the case where all the noise levels of the YUV components are low, the difference in noise level between the Y component and the UV components is equal to or lower than the threshold Tha, and the first mode M1 is selected. As illustrated in FIG. 11A, when the first mode M1 is selected, the mode-based change amount calculation circuit 703 outputs directly the amounts of change $\Delta Y$, $\Delta U$, and $\Delta V$ calculated for the individual YUV components as mode-based amounts of change $\Delta Y_{MODE1}$, $\Delta U_{MODE1}$, and $\Delta V_{MODE1}$.

Meanwhile, when determining in S803 that the difference between the noise level of the Y component and the noise level of the UV components is higher than the threshold Tha (No), the mode selection circuit 702 moves the process to S804. In S804, the mode selection circuit 702 compares the noise level of the Y component and the noise level of the UV components to a predetermined threshold Thb described in FIG. 10. Specifically, in S804, the mode selection circuit 702 determines whether both the noise level of the Y component and the noise level of the UV components are equal to or higher than the predetermined threshold Thb described in FIG. 10. When determining that the noise levels of the Y component and the UV components are equal to or higher than the threshold Thb (Yes), the mode selection circuit 702 moves the process to S807. When determining that any one of the noise levels is lower than the threshold Thb (No), the mode selection circuit 702 moves the process to S806.

When moving the process to S806, the mode selection circuit 702 selects the second mode M2 and sends a mode signal indicative of the selected second mode M2 to the mode-based change amount calculation circuit 703. Then, in S806, the mode-based change amount calculation circuit 703 calculates mode-based amounts of change $\Delta U_{MODE2}$ and $\Delta V_{MODE2}$ of the UV components by Equations (10) and (11). At that time, the mode-based change amount calculation circuit 703 outputs the amount of change $\Delta Y$ of the Y component directly as mode-based amount of change $\Delta Y_{MODE2}$. After S806, the process in the flowchart of FIG. 8 is performed on the next focused frame.

$$\Delta U_{MODE2} = \Delta Y(v, h, t) \times \frac{\sigma^2_{U(v,h,t)}}{\sigma^2_{Y(v,h,t)} + \sigma^2_{U(v,h,t)}} + \qquad \text{Equation (10)}$$
$$\Delta U(v, h, t) \times \frac{\sigma^2_{Y(v,h,t)}}{\sigma^2_{Y(v,h,t)} + \sigma^2_{U(v,h,t)}}$$

$$\Delta V_{MODE2} = \Delta Y(v, h, t) \times \frac{\sigma^2_{V(v,h,t)}}{\sigma^2_{Y(v,h,t)} + \sigma^2_{V(v,h,t)}} + \qquad \text{Equation (11)}$$
$$\Delta V(v, h, t) \times \frac{\sigma^2_{Y(v,h,t)}}{\sigma^2_{Y(v,h,t)} + \sigma^2_{V(v,h,t)}}$$

FIG. 11B is an image diagram illustrating an example of an input 1110 and an output 1111 of the mode-based change amount calculation circuit 703 in the case where any one of the noise levels of the Y component and the UV components is lower than the threshold Thb and the second mode is selected. As illustrated in FIG. 11B, when the second mode M2 is selected, the mode-based change amount calculation circuit 703 outputs directly the amount of change $\Delta Y$ of the Y component calculated by Equation (7) as mode-based amount of change $\Delta Y_{MODE2}$. Meanwhile, the mode-based change amount calculation circuit 703 calculates the mode-based amounts of change $\Delta U_{MODE2}$ and $\Delta V_{MODE2}$ of the UV components by Equations (10) and (11).

That is, in the second mode M2, for the UV components, the amounts of change obtained by blending the amount of change $\Delta Y$ calculated for the Y component and the amounts of change $\Delta U$ and $\Delta V$ calculated for the UV components are set as mode-based amounts of change $\Delta U_{MODE2}$ and $\Delta V_{MODE2}$. The blend ratio between the amounts of change are determined in accordance with the noise level (dispersion $\sigma^2_{Y(v,h,t)}$) of the Y component and the noise levels (dispersions $\sigma^2_{U(v,h,t)}$ and $\sigma^2_{V(v,h,t)}$) of the UV components as expressed in Equations (10) and (11). That is, the blend ratio between the amounts of change is determined in accordance with the proportions between the noise level of the Y component and the noise levels of the UV components, in such a manner that, as the noise level of the Y component is less as compared to the noise levels of the UV components, the blend ratio of the amount of change of the Y component is higher relative to the amounts of change of the UV components.

In S804, when determining that both the noise levels of the Y component and the UV components are equal to or more than the threshold Thb (Yes) and moving the process to S807, the mode selection circuit 702 selects the third mode M3 and sends a mode signal indicative of the selection to the mode-based change amount calculation circuit 703. When all the noise levels of the YUV components are high as in the case where the third mode M3 is selected, the SN ratio as ratio between the signal component and the noise component is low, and the amounts of change between frames may not be accurately calculated under the influence of noise. Accordingly, when the third mode M3 is selected, the mode-based change amount calculation circuit 703 outputs preset values for the YUV components as mode-based amounts of change $\Delta Y_{MODE3}$, $\Delta U_{MODE3}$, and $\Delta V_{MODE3}$ without performing the process for calculating the amounts of change. After S807, the process in the flowchart of FIG. 8 is performed on the next focused frame.

When the third mode M3 is selected, the mode-based change amount calculation circuit 703 may adjust the values of the amounts of change based on the user's selection. For example, when the user inputs an instruction via the client device 102 to the control circuit 207 to request image quality with high priority placed on the noise reduction effect, the mode-based change amount calculation circuit 703 sets the amounts of change to small values. This makes it possible to obtain the images with noise effectively reduced. Meanwhile, when the user inputs an instruction via the client device 102 to the control circuit 207 to request image quality with high priority placed on visibility of the moving subject, the mode-based change amount calculation circuit 703 sets the amounts of change to large values. This makes it possible to obtain the images with afterimages and motion blurring reduced.

As described above, in the embodiment, when all the noise levels of the YUV components are low (when the first mode M1 is selected), the amounts of change calculated for the individual YUV components are used as mode-based amounts of change. That is, when all the noise levels of the YUV components are low, it is possible to set the recursive coefficients described later based on the high-accuracy amounts of change for the YUV components.

Meanwhile, in the embodiment, when all the noise levels of the YUV components are high (when the third mode M3 is selected), the preset amounts of change for the individual YUV components are used as mode-based amounts of change. That is, when all the noise levels of the YUV components are high, accuracy of the calculated amounts of change is likely low, and therefore using the preset amounts of change are used to prevent the recursive coefficients from being set based on the low-accuracy amounts of change.

In addition, in the embodiment, in a scene where the difference between the noise level of the Y component and the noise levels of the UV components is large (when the second mode M2 is selected), a blend of the Y component and the UV components is used as mode-based amounts of change for the UV components. That is, when the noise levels of the UV components are higher than the noise level of the Y component, the amounts of change are determined in S503 and S504 described later with consideration given to the noise levels of the YUV components. This makes it possible to set the recursive coefficients suitable for that scene.

In this manner, the embodiment enables the calculation of the high-accuracy amounts of change between frames in any scene, which makes it possible to set the appropriate recursive coefficients based on the high-accuracy amounts of change between frames. Therefore, according to the embodiment, it is possible to reduce residual noise in a stationary subject and suppress an afterimage around a moving subject. In the conventional recursive NR process described in Japanese Patent Laid-Open No. 2000-224444 mentioned above, neither the mode selection in accordance with the noise levels of the YUV components nor the calculation of the amounts of change and the setting of recursive coefficients in accordance with the mode is performed, unlike in the embodiment. In addition, when the motion detection method described in Japanese Patent Laid-Open No. 63-131794 is used, the SN ratio is insufficient and the accuracy of motion detection becomes low in the case of moving images with a large amount of noise, which makes it impossible to set the appropriate recursive coefficients. In contrast to this, in the embodiment, it is possible to set the appropriate recursive coefficients in accordance with the noise levels of the YUV components.

The modes described in relation to S503 of the embodiment include the three, first to third modes. However, the modes are not limited to them but may be four or more modes to execute finer controls.

The description will be returned to the flowchart of FIG. 5.

Figure 12:
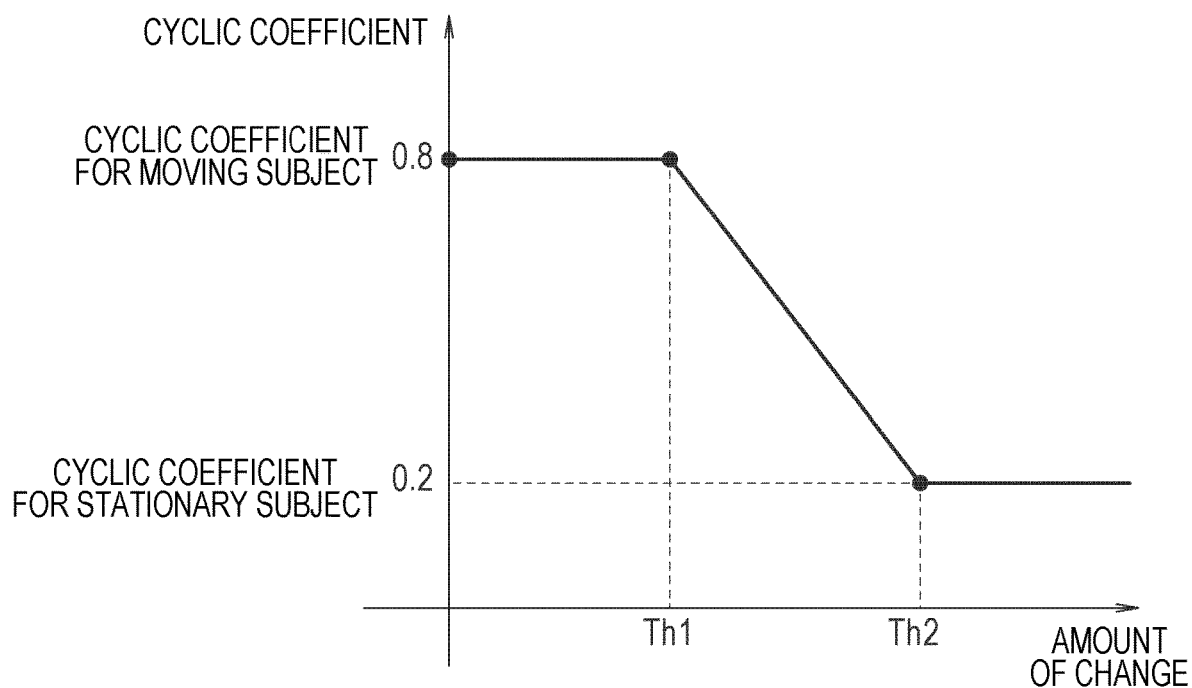
FIG. 12 is a diagram illustrating the relationship between the amount of change between frames and the recursive coefficients according to one or more aspects of the present disclosure.

In S504, the recursive coefficient calculation circuit 404 calculates the recursive coefficients based on the amounts of change calculated in S503. FIG. 12 is a graph illustrating the relationship between the amount of change and the recursive coefficient of the Y component. As illustrated in FIG. 12, the recursive coefficient calculation circuit 404 compares the value of the amount of change to predetermined thresholds (thresholds Th1 and Th2). When the value of the amount of change is less than the threshold (less than the threshold Th1), the recursive coefficient calculation circuit 404 then assumes that the Y component is obtained from frames of a stationary subject, and sets the recursive coefficient to a large value. Meanwhile, when the value of the amount of change is equal to or more than the predetermined threshold (equal to or more than the threshold Th2), the recursive coefficient calculation circuit 404 then assumes that the Y component is obtained from frames of a moving subject, and sets the recursive coefficient to a small value. When the value of change of amount is equal to or more than the threshold Th1 and is less than the threshold Th2, the recursive coefficient calculation circuit 404 sets the value of the recursive coefficient to be less with increase in the value of the amount of change. The thresholds Th1 and Th2 are parameters determined as appropriate with consideration given to the amount of noise included in the input signal of the Y component. As an example, the thresholds Th1 and Th2 are set in accordance with the noise level (dispersion) of the Y component, as expressed in Equation (12).

$$Th1=2\sigma_Y$$

$$Th2=3\sigma_Y \qquad \text{Equation (12)}$$

As illustrated in FIG. 12, when the value of the recursive coefficient for a stationary subject is set to 0.8 and the value of the recursive coefficient for a moving subject is set to 0.2, for example, the recursive coefficient calculation circuit 404 calculates the recursive coefficient a of the Y component by Equation (13) using the thresholds Th1 and Th2 and the value of the amount of change. Although not described as an equation, for the UV components, the recursive coefficient calculation circuit 404 calculates the values of the recursive coefficients for a stationary subject and the values of the recursive coefficients for a moving subject by Equation (13) in which Y is replaced with U or V.

$$\Delta Y(v, h, t) < Th1 \rightarrow \alpha=0.8$$

$$\Delta Y(v, h, t) \geq Th2 \rightarrow \alpha=0.2$$

$$Th1 \leq \Delta Y(v, h, t) < Th2 \rightarrow \alpha=((0.2-0.8)/(Th2-Th1)) \times (\Delta Y(v, h, t)-Th1)+0.8 \qquad \text{Equation (13)}$$

Figure 13:
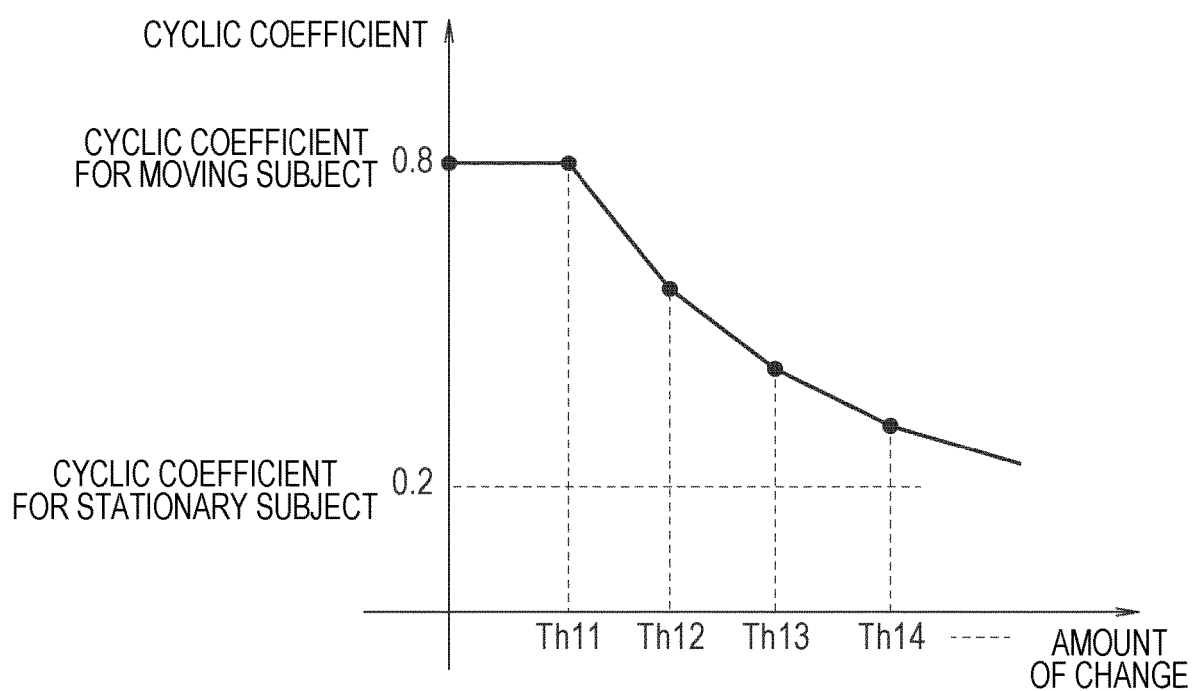
FIG. 13 is a diagram illustrating an example of a case of changing smoothly the recursive coefficient according to one or more aspects of the present disclosure.

In the foregoing example, the two thresholds Th1 and Th2 are set. Alternatively, three or more thresholds, for example, may be set such that the value of the recursive coefficient smoothly changes in accordance with the amount of change. FIG. 13 is a diagram illustrating an example in which a plurality of thresholds Th11, Th12, Th13, Th14, . . . is set so that the value of the recursive coefficient can change smoothly in accordance with the amount of change. In the case of the example of FIG. 13, the threshold Th11 is a threshold for setting the value of the recursive coefficient for a stationary subject to 0.8, and the subsequent thresholds Th12, Th13, Th14, . . . are set to larger values in this order. The value of the amount of change is set such that the value of the recursive coefficient becomes smaller with increase in the value of the amount of change all in the case where the value of the amount of change is equal to or more than the threshold Th11 and less than the threshold Th12, in the case where the value of the amount of change is equal to or more than the threshold Th12 and less than the threshold Th13, and in the case where the value of the amount of change is equal to or more than the threshold Th13 and less than the threshold Th14.

Next, in S505, the composite processing circuit 405 composites the YUV input signals and the YUV output signals in accordance with the recursive coefficient α calculated in S504, and generates the YUV output signals of the current frame. Next, in S506, the signal holding circuit 406 holds the YUV output signals obtained in S505.

Next, in S507, the output signal processing circuit 407 acquires the YUV output signals $Y_{OUT}(v, h, t)$, $U_{OUT}(v, h, t)$, and $V_{OUT}(v, h, t)$ of the current frame having undergone the composition process by the composite processing circuit 405. Further, the output signal processing circuit 407 uses Equation (14) to convert the YUV output signals $Y_{OUT}(v, h, t)$, $U_{OUT}(v, h, t)$, and $V_{OUT}(v, h, t)$ into the RGB output signals $R_{OUT}(v, h, t)$, $G_{OUT}(v, h, t)$, and $B_{OUT}(v, h, t)$. Then, the output signal processing circuit 407 sends the RGB output signals $R_{OUT}(v, h, t)$, $G_{OUT}(v, h, t)$, and $B_{OUT}(v, h, t)$ to the image output terminal 305 illustrated in FIG. 3.

$$R_{OUT}(v, h, t)=1.00 \times Y_{OUT}(v, h, t)+1.402 \times V_{OUT}(v, h, t) G_{OUT}(v, h, t)=1.00 \times Y_{OUT}(v, h, t)-0.334 \times U_{OUT}(v, h, t)-0.714 \times V_{OUT}(v, h, t) B_{OUT}(v, h, t)=1.00 \times Y_{OUT}(v, h, t)-1.772 \times U_{OUT}(v, h, t) \qquad \text{Equation (14)}$$

Next, in S508, the recursive NR processing circuit 304 determines whether S501 to S507 have been performed on all the pixels of the current frame. When there is any pixel yet to be processed, the recursive NR processing circuit 304 returns the process to S501 to perform S501 to S507 on the unprocessed pixel. Meanwhile, when determining that S501 to S507 have been performed on all the pixels of the current frame, the recursive NR processing circuit 304 terminates the process in the flowchart of FIG. 5 on the current frame, and moves to the process on the next frame.

In the foregoing embodiment, the noise levels are calculated for the individual YUV components to improve the accuracy in detecting the amounts of change between frames. However, there is no particular limitation on the data format of input signals processed by the recursive NR processing circuit 304. For example, it is possible to execute similar processes on, for example, RGB components, Lab components, and visible and invisible components.

As an example, a case of using RGB components will be described.

Hereinafter, the component of color R will be called R component, the component of color G will be called G component, the component of color B will be called B component, and the R component and the B component will be collectively called RB components. The example of using the RGB components will be described with reference to the above-mentioned diagrams.

In the example of using the RGB components, in S501 of FIG. 5, the input signal acquisition circuit 401 does not convert the RGB input signals into YUV input signals but sends the same directly to the noise level calculation circuit 402, the inter-frame change amount calculation circuit 403, and the composite processing circuit 405. When the signals input into the recursive NR processing circuit 304 are YUV input signals, the input signal acquisition circuit 401 may convert the YUV input signals into RGB input signals and send the same to the noise level calculation circuit 402, the inter-frame change amount calculation circuit 403, and the composite processing circuit 405.

Next, in S502, the noise level calculation circuit 402 calculates the noise levels of the RGB components from the RGB input signals $R_{IN}(v, h, t)$, $G_{IN}(v, h, t)$, and $B_{IN}(v, h, t)$ of the current frame. In the case of this example, the noise level calculation circuit 402 calculates the respective noise dispersions $\sigma^2_{R(v, h, t)}$, $\sigma^2_{G(v, h, t)}$, and $\sigma^2_{B(v, h, t)}$ of the R component, the G component, and the B component by Equations (3) and (4) described above where Y is replaced with R, G, or B. In the case of using the RGB components, as described above, the evaluation values of the noise levels can be the standard deviations of noise, the noise characteristics of the imaging sensor, or the like.

Next, in S503, the inter-frame change amount calculation circuit 403 selects one of the first to third modes described above in accordance with the noise levels of the RGB input signals calculated in S502, and calculates the mode-based amounts of change between frames in the selected mode. In the case of using the RGB components, the first mode M1 is a mode in which the respective amounts of change calculated for the R component, the G component, and the B component are set as mode-based amounts of change. The second mode M2 is a mode in which the amounts of change calculated for the individual RGB components are blended into the mode-based amount of change. The third mode M3 is a mode in which the amounts of change between frames are not calculated but preset values are used as mode-based amounts of change as described above.

In the case of using the RGB components, in S801 in the flowchart of FIG. 8, the inter-frame change amount calculation circuit 403 calculates the amounts of change between the RGB input signals of the current frame and the RGB output signals of the previous frame for the individual RGB components, and sets the calculated amounts of change as component-based amounts of change. In the case of using the RGB components, the inter-frame change amount calculation circuit 403 can be configured such that Y is replaced with G, U is replaced with R, and V is replaced with B with reference to FIG. 7 described above. Accordingly, in S801, the component-based change amount calculation circuit 701 determines the difference absolute values for the individual RGB components and calculates the determined values as the component-based amounts of change of the RGB components, by using Equation (7) in which Y is replaced with G, Equation (8) in which U is replace with R, and Equation (9) in which V is replaced with B. In the case of this example, as described above, the component-based amounts of change are not limited to the difference absolute values but may be calculated as, for example, difference square values, difference absolute values of low-frequency components, or the like.

Next, in S802, the mode selection circuit 702 determines what mode, among the first mode M1, the second mode M2, and the third mode M3, is to be used in accordance with the noise levels of the RGB components acquired by the noise level calculation circuit 402. In the foregoing case of the example in which the YUV components are used, the YUV components are separated into the Y component and the UV components. In the case of using the RGB components, the RGB components are separated into the G component and the RB components with consideration given to a human's visual characteristics.

With reference to FIG. 10 described above in which Y is replaced with G, U is replaced with R, and V is replaced with B, when determining in S803 that the difference between the noise level of the G component and the noise levels of the RB components is less than the threshold Tha, the mode selection circuit 702 selects the first mode M1 in S805. When selecting the first mode M1, the mode-based change amount calculation circuit 703 outputs directly the calculated RGB component-based amounts of change as mode-based amounts of change as described above. In the case of using the RGB components, the thresholds Tha and Thb may be different in value from the thresholds Tha and Thb in the case of using the YUV components described above.

When determining in S803 that the difference in noise level between the G component and the RB components is equal to or more than the threshold Tha and determining in S804 that the noise levels of the G component and the RB components are less than the threshold Thb, the mode selection circuit 702 selects the second mode M2 in S806. When selecting the second mode M2, the mode-based change amount calculation circuit 703 uses the amount of change calculated in S801 as the mode-based amount of change for the G component. Meanwhile, for the RG components, the mode-based change amount calculation circuit 703 uses Equations (10) and (11) in which Y is replaced with G, U is replaced with R, and V is replaced with B to blend the amount of change of the G component and the amounts of change of the RB components to calculate the mode-based amount of change. In the case of using the RGB components, equations different from Equations (10) and (11) may be used.

When determining in S804 that both the noise levels of the G component and the RB components are equal to or more than the threshold Thb, the mode selection circuit 702 selects the third mode M3. When the third mode M3 is selected, that is, when all the noise levels of the RGB components are high, the SN ratio between the signal component and the noise component is low, and the amounts of change between frames may not be accurately calculated under the influence of noise. Accordingly, in the case of using the RGB components, as described above, when the third mode M3 is selected, the mode-based change amount calculation circuit 703 does not perform the process for calculating the amounts of change but outputs preset values of the RGB components as mode-based amounts of change. In addition, as described above, the mode-based change amount calculation circuit 703 can adjust the values of the amounts of change in accordance with an instruction from the user for image quality with high priority placed on the noise reduction effect, an instruction from the user for image quality with high priority placed on the visibility of a moving subject, or the like.

In the case of this example, in S504, the recursive coefficient calculation circuit 404 calculates the recursive coefficients based on the amounts of change calculated in S503. With reference to FIG. 12 described above as an example, when the value of the amount of change is less than the threshold Th1, the recursive coefficient calculation circuit 404 assumes that the G component is obtained from frames of a stationary subject, and sets the recursive coefficient to a large value. Meanwhile, when the value of the amount of change is equal to or more than Th2, the recursive coefficient calculation circuit 404 assumes that the G component is obtained from frames of a moving subject, and sets the recursive coefficient to a small value. When the value of the amount of change is equal to or more than the threshold Th1 and is less than the threshold Th2, the recursive coefficient calculation circuit 404 sets the value of the recursive coefficient to be smaller with increase in the value of the amount of change. The thresholds Th1 and Th2 are parameters determined as appropriate with consideration given to the amount of noise included in the input signal of the G component. As an example, the thresholds Th1 and Th2 can be determined by Equation (12) described above in which Y is replaced with G. In the case of using the RGB components, the value of the recursive coefficient for a stationary subject illustrated in FIG. 12 may be different from 0.8, and the value of the recursive coefficient for a moving subject may be different from 0.2. The recursive coefficient a of the G component may be calculated by Equation (13) described above in which Y is replaced with G using the thresholds Th1 and Th2 and the value of the amount of change. The recursive coefficients of the R component and B component can be similarly calculated. In the case of this example, three or more thresholds may be set as in FIG. 13 described above.

Next, in S505, the composite processing circuit 405 composites the RGB input signals and the RGB output signals in accordance with the recursive coefficients a calculated in S503 to generate the RGB output signals of the current frame. Then, in S506, the signal holding circuit 406 holds the RGB output signals obtained in S505. In the case of using the RGB components, S507 of FIG. 5 is not performed. S508 is performed as described above.

In the case of using the RGB components, the modes described in relation to S503 are not limited to the three, first to third modes. The modes may be four or more modes to execute finer controls.

In the case of, for example, using Lab color space components instead of the RGB components, the recursive NR processing circuit 304 uses a brightness component L instead of the Y component and uses complementary components a and b instead of the UV components. In addition, in the case of using visible and invisible components, for example, a visible light component and an invisible light component such as infrared ray, the recursive NR processing circuit 304 uses the invisible light component instead of the Y component and uses the invisible light component instead of the UV components.

As described above, in the embodiment, the recursive NR process is performed by calculating the amounts of change between frames for the individual signal components and setting the recursive coefficients based on the amounts of changes between frames for the individual signal components. Accordingly, the embodiment makes it possible to reduce noise in a stationary subject and suppress color trailing around a moving subject.

The present disclosure can be implemented by supplying programs for implementing one or more of the functions in the foregoing embodiment to a system or a device via a network or a storage medium so that one or more processors in a computer in the system or the device can read and execute the programs. Alternatively, the present disclosure can be implemented by a circuit performing one or more of the functions (for example, ASIC).

The foregoing embodiment is a mere exemplification for carrying out the present disclosure. The technical scope of the present disclosure should not be interpreted in a limited way due to the embodiment. That is, the present disclosure can be carried out in various manners without deviating from its technical ideas or major features.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-093248, filed May 9, 2017, which is hereby incorporated by reference herein in its entirety.

What is claimed is:
1. An image processing apparatus comprising:
a detection circuit configured to detect a noise level of a signal of a focused frame in moving images;
a change amount detection circuit configured to detect an amount of change between the focused frame and a previous frame preceding the focused frame by using the noise level of the focused frame, the signal of the focused frame, and a signal of the previous frame after a noise reduction process;

a coefficient calculation circuit configured to set a coefficient for use in the noise reduction process in accordance with the amount of change; and a processing circuit configured to perform the noise reduction process on the signal of the focused frame by using the signal of the focused frame, the signal of the previous frame after the noise reduction process, and the coefficient, wherein the change amount detection circuit changes a method for detecting the amount of change depending on the noise level of the focused frame.

2. The image processing apparatus according to claim 1, further comprising:

a holding circuit configured to hold the signal of the previous frame after the noise reduction process, wherein the change amount detection circuit detects the amounts of change using the signal held in the holding circuit as the signal of the previous frame after the noise reduction process, and the processing circuit performs the noise reduction process using the signal held in the holding circuit as the signal of the previous frame after the noise reduction process.

3. The image processing apparatus according to claim 1, wherein the processing circuit performs a process for compositing the signal of the focused frame and the signal of the previous frame after the noise reduction process, in accordance with the coefficient, as the noise reduction process on the signal of the focused frame.

4. The image processing apparatus according to claim 1, wherein the coefficient calculation circuit sets, as the coefficient, a recursive coefficient for use in a recursive noise reduction processing, and the processing circuit performs the recursive noise reduction processing using the recursive coefficient, as the noise reduction process.

5. The image processing apparatus according to claim 1, wherein the detection circuit detects at least one of standard deviation and dispersion of noise, as an evaluation value representing the noise level of the signal in the focused frame.

6. An image processing method, comprising:
detecting a noise level of a signal of a focused frame in moving images;
detecting an amount of change between the focused frame and a previous frame preceding the focused frame by using the noise level of the focused frame, the signal of the focused frame, and a signal of the previous frame after a noise reduction process;
setting a coefficient for use in the noise reduction process in accordance with the amount of change; and
performing the noise reduction process on the signal of the focused frame by using the signal of the focused frame, the signal of the previous frame after the noise reduction process, and the coefficient,
wherein the change amount detection circuit changes a method for detecting the amount of change depending on the noise level of the focused frame.

7. A non-transitory computer-readable storage medium for storing an image processing program that enables a computer to:
detect a noise level of a signal of a focused frame in moving images;
detect an amount of change between the focused frame and a previous frame preceding the focused frame by using the noise level of the focused frame, the signal of the focused frame, and a signal of the previous frame after a noise reduction process;
set a coefficient for use in the noise reduction process in accordance with the amount of change; and
perform the noise reduction process on the signal of the focused frame by using the signal of the focused frame, the signal of the previous frame after the noise reduction process, and the coefficient,
wherein the change amount detection circuit changes a method for detecting the amount of change depending on the noise level of the focused frame.

8. The image processing apparatus according to claim 1, wherein the detection circuit detects noise levels of a plurality of components included in the signal of the focused frame.

9. The image processing apparatus according to claim 8, wherein the change amount detection circuit calculates a difference for each component between the focused frame and the previous frame, and calculates the amount of change based on the difference for each component in a manner corresponding to the noise levels of the plurality of components.

10. The image processing apparatus according to claim 9, wherein
the plurality of components includes a first component and a second component, and
when the difference between the noise level of the first component and the noise level of the second component is smaller than a predetermined first threshold, the change amount detection circuit uses the difference calculated for the first component and the difference calculated for the second component as the amount of the change.

11. The image processing apparatus according to claim 10, wherein when the difference between the noise level of the first component and the noise level of the second component is equal to or higher than the predetermined first threshold, the change amount detection circuit uses the difference obtained by blending the difference calculated for the first component and the difference calculated for the second component as the amount of change.

12. The image processing apparatus according to claim 9, wherein when both the noise level of the first component and the noise level of the second component are equal to or higher than a predetermined second threshold, the change amount detection circuit uses preset value as the amount of change.

13. The image processing apparatus according to claim 9, wherein the first component is a luminance component, and the second component is a chrominance component.

* * * * *